United States Patent
Chung et al.

(10) Patent No.: US 9,432,875 B2
(45) Date of Patent: *Aug. 30, 2016

(54) CALL ADMISSION CONTROL

(71) Applicant: KT CORPORATION, Gyeonggi-do (KR)

(72) Inventors: Jae-Ho Chung, Seoul (KR); Wi-Sang Rho, Seoul (KR); Yung-Ha Ji, Gyeonggi-do (KR); Kyu-Jeong Han, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,324

(22) Filed: Dec. 1, 2014

(65) Prior Publication Data
US 2015/0087326 A1 Mar. 26, 2015

Related U.S. Application Data

(63) Continuation of application No. 13/889,636, filed on May 8, 2013, now Pat. No. 8,929,910.

(30) Foreign Application Priority Data

May 14, 2012 (KR) .................. 10-2012-0050853

(51) Int. Cl.
*H04W 72/00* (2009.01)
*H04W 28/02* (2009.01)
*H04W 48/06* (2009.01)
(Continued)

(52) U.S. Cl.
CPC ......... *H04W 28/0289* (2013.01); *H04W 28/08* (2013.01); *H04W 48/06* (2013.01); *H04L 47/10* (2013.01)

(58) Field of Classification Search
CPC ... H04W 28/08; H04W 24/00; H04W 8/245; H04L 47/10
USPC ........................ 455/453, 452.1, 418; 370/237
See application file for complete search history.

(56) References Cited

U.S. PATENT DOCUMENTS 8,111,714 B2 2/2012 Melsen et al.
8,315,163 B2 11/2012 Xu
8,346,275 B2 1/2013 Ogura
(Continued)

FOREIGN PATENT DOCUMENTS

KR 10-2005-0114589 A 12/2005
KR 10-2007-0027468 A 3/2007
(Continued)

*Primary Examiner* — Danh Le
(74) *Attorney, Agent, or Firm* — IP Legal Services, LLC

(57) ABSTRACT

The disclosure is related to a method of adaptive call admission control in a base station. When a call access request is received from a user equipment determination may be made as to whether an available call admission capacity of the base station reaches a first limit. When the available call admission capacity of the base station reaches the first limit determination may be made as to whether the received call access request is for a preferred call. Then, determination may be made as to whether a reserved call admission capacity reaches a second limit when the received call access request is for the preferred call. When the reserved call admission capacity has not reached a second limit, access of the user equipment associated with the received call access request may be allowed.

7 Claims, 5 Drawing Sheets

(51) Int. Cl.
  *H04W 28/08* (2009.01)
  *H04L 12/801* (2013.01)

(56) References Cited

U.S. PATENT DOCUMENTS

| | | | |
|---|---|---|---|
| 8,792,419 B2 * | 7/2014 | Wohlert | H04W 4/04 370/328 |
| 2005/0260997 A1 | 11/2005 | Korale et al. | |
| 2005/0282550 A1 | 12/2005 | Cho et al. | |
| 2007/0224930 A1 | 9/2007 | Fukui et al. | |
| 2009/0069023 A1 | 3/2009 | Ahn et al. | |
| 2009/0290493 A1 | 11/2009 | Xu | |
| 2010/0189084 A1 * | 7/2010 | Chen | H04W 84/045 370/338 |
| 2010/0285812 A1 * | 11/2010 | Murakami | H04W 72/10 455/452.1 |
| 2011/0244870 A1 | 10/2011 | Lee | |
| 2011/0275347 A1 * | 11/2011 | Aoyagi | H40W 36/0061 455/411 |
| 2012/0259950 A1 | 10/2012 | Havekes et al. | |
| 2013/0010669 A1 | 1/2013 | Meier et al. | |
| 2014/0018059 A1 * | 1/2014 | Noonan | H04W 8/005 455/419 |
| 2014/0180749 A1 | 6/2014 | Woodward | |

FOREIGN PATENT DOCUMENTS

| | | |
|---|---|---|
| KR | 10-2008-0054654 A | 6/2008 |
| KR | 10-2010-0007484 A | 1/2010 |
| KR | 10-0991592 B1 | 11/2010 |
| KR | 10-1001045 B1 | 12/2010 |
| KR | 10-2011-0111374 A | 10/2011 |

\* cited by examiner

CALL ADMISSION CONTROL

CROSS REFERENCE TO PRIOR APPLICATIONS

The present application is continuation application of U.S. patent application Ser. No. 13/889,636 (filed on May 8, 2013), which claims priority under 35 U.S.C. §119 to Korean Patent Application No. 10-2012-0050853 (filed on May 14, 2012).

BACKGROUND

The present disclosure relates to communication, more particularly, to adaptive call admission control in a femtocell base station.

A femtocell may be a small and low-powered mobile communication service area formed by a femtocell base station. The femtocell may be also referred to as a small cell, a picocell, a microcell, and an ubicell. The femtocell base station may be referred to as a femtocell access point (AP). The femtocell base station may be also referred to as a Home Node B (HNB) for a third generation partnership project (3GPP) femtocell or a Home eNodeB (HeNB) for an LTE femtocell. The femtocell may be typically designed for use in a home or small business. The femtocell base station may be used to improve a service quality or to guarantee a certain level of a service quality at a certain area. In general, the femtocell base station may be installed at a shadow area or an area having deteriorated radio signals of macrocells. Furthermore, the femtocell base station may be installed at a service area of a macrocell for reducing a processing load of the macrocell.

Typically, a femtocell base station may form a comparatively small service area and support the comparatively small number of users at the same time. Accordingly, it may be required to efficiently perform operations such as call admission control in the femtocell base station due to the limited number of supporting users (i.e., user equipments) for providing a related service.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiments, a femtocell base station may perform adaptive call admission control according to a type of calls, such as a normal call and a preferred call.

In accordance with another aspect of the present embodiments, a femtocell base station may accept a call having a certain priority although a call admission capacity of the femtocell base station reaches a predetermined limit.

In accordance with still another aspect of the present embodiments, an overall call admission capacity of a femtocell base station may be divided into an available call admission capacity for accepting any calls and a reserved call admission capacity for accepting a call assigned with a priority and the femtocell base station may adaptively perform call admission control based on the available call admission capacity and the reserved call admission capacity.

In accordance with an embodiment, a method may be provided for adaptive call admission control in a base station. The method may include receiving a call access request from a user equipment, determining whether an available call admission capacity of the base station reaches a first limit, determining whether the received call access request is for a preferred call when the available call admission capacity of the base station reaches the first limit, determining whether a reserved call admission capacity reaches a second limit when the received call access request is for the preferred call, and allowing access of the user equipment associated with the received call access request when the reserved call admission capacity has not reached as second limit.

In accordance with another embodiment, an adaptive call admission method in a femtocell base station may be provided. The method may include receiving a call access request from a user equipment, determining whether a call type is one of a normal call and a preferred call based on the received call access request corresponding to the call, and performing adaptive call admission control according to the determined call type.

When the call type is the preferred call and when the reserved call admission capacity has not reached the second limit, the received call access request for the preferred call may be accepted. When the call type is the normal call and when the available call admission capacity has not reached the first limit, the received call access request for the normal call may be accepted.

In accordance with still another embodiment, a base station may be provided for adaptive call admission control. The base station may include a receiver and a controller. The receiver may be configured to receive a call access request from a user equipment. The controller may be configured to determine whether an available call admission capacity reaches a first limit, to determine whether a reserved call admission capacity reaches a second limit, to determine whether a type of a call is one of a normal call and a preferred call based on the received call access request, and to adaptively perform call admission control according to the determined call type.

The controller may allow access of the user equipment associated with the preferred call when the type of the call is the preferred call and when the reserved call admission capacity has not reached the second limit although the available call admission capacity reaches the first limit. The controller may disallow access of the user equipment associated with the normal call when the type of the call is the normal call and when the available call admission capacity reaches the first limit although the reserved call admission capacity has not reached the second limit.

BRIEF DESCRIPTION OF THE DRAWINGS

The above and/or other aspects of the present embodiments will become apparent and more readily appreciated from the following description of embodiments, taken in conjunction with the accompanying drawings, of which.

DETAILED DESCRIPTION OF EMBODIMENTS

Figure 1:
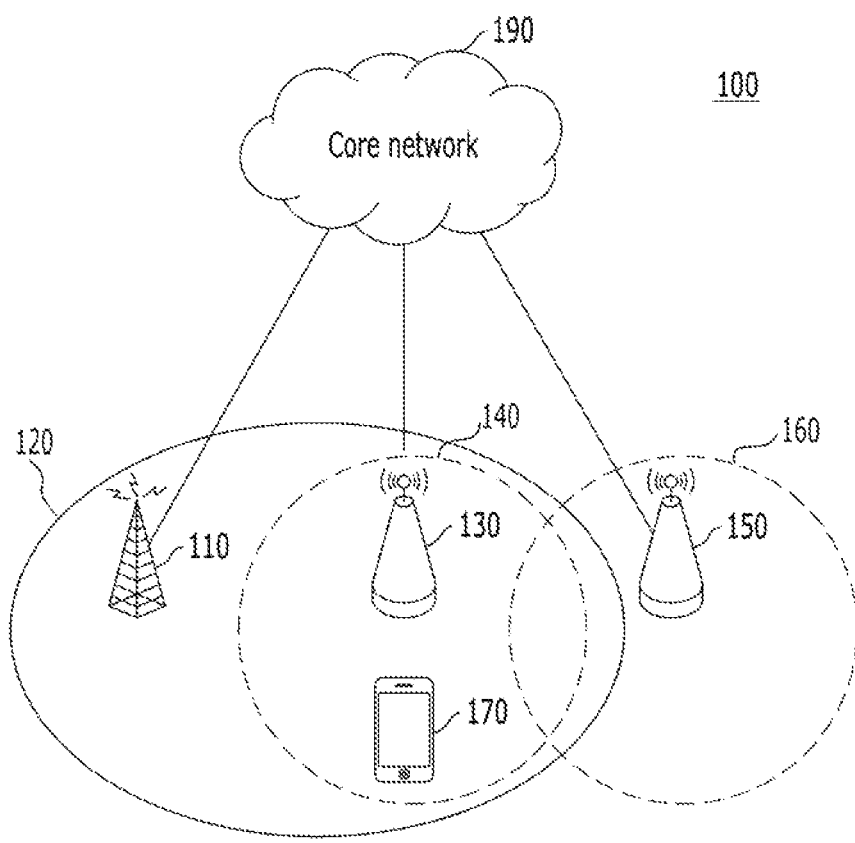
FIG. 1 illustrates a femtocell included in a communication network in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

In order to improve efficiency in operation of a femtocell base station, a femtocell base station may perform call admission control according to a type of user equipment such as a registered user equipment and a non-registered user equipment. Particularly, a femtocell base station may perform operations in three different modes: a public mode, a private mode, and a flexible private mode. In the public mode, a femtocell base station may allow any user equipments to be accessed without discrimination of non-registered user equipments and registered user equipments. In the private mode, the femtocell base station may provide a relate service only to registered user equipments. In the flexible private mode, the femtocell base station may provide a related service not only to registered user equipments but also to non-registered user equipment. As described, the call admission control may be performed differently according to the type of user equipments such as the registered user equipments and the non-registered user equipment.

As another example for improving the efficiency in a femtocell base station, the femtocell base station may perform call admission control according to a type of user equipment, non-CSG user equipments and CSG user equipments. That is, the number of user equipments that the femtocell base station will allow may be restricted differently according to the type of user equipments. The femtocell base station may perform call admission control in three different access control modes: a closed access mode, a hybrid access node, and an open access mode. The femtocell base station may perform call admission control based on a call admission capacity determined according to the access control modes. In the closed access mode, femtocell base stations 130 and 150 only allow user equipments included in a closed subscriber group (CSG) to access, which are referred to as CSG user equipments. Accordingly, the call admission capacity may be the number of CSG user equipments in the closed access mode. In the hybrid access mode, femtocell base stations 130 and 150 allow not only CSG user equipments but also user equipments in non-closed subscriber group, which are referred to as non-CSG user equipments. In the hybrid access mode, the call admission capacity may be determined each for the number of CSG user equipments and the number of non-CSG user equipments. In the open access mode, femtocell base stations 130 and 150 allow any user equipments to be accessed without discrimination of CSG user equipments and non-CSG user equipments if a call admission capacity does not reach a predetermined limit. Accordingly, the call admission capacity may be determined as the total number of user equipments in service. As described, the call admission control may be performed according to the type of user equipments such as CSG user equipment and non-CSG user equipment.

In accordance with at least one embodiment, a femtocell base station may perform adaptive call admission control according to a type of a call, such as a normal call and a preferred call. The normal call may be a call without a priority assigned. The preferred call may be a call assigned with a predetermined priority, such as a voice over internet protocol (VoIP) call, a hand-in call, and an emergency call. Call admission capacities may be differently set according to the type of calls and the call admission control may be performed based on the call admission capacities. In order to perform adaptive call admission control, an overall call admission capacity of a femtocell base station may be divided into an available call admission capacity and a reserved call admission capacity. Particularly, a femtocell base station may admit a call access request of a preferred call when there is remaining in the reserved call admission capacity although the available call admission capacity already reaches a limit in accordance with at least one embodiment. Hereinafter, a communication network including a femtocell base station for adaptive call admission control in accordance with at least one embodiment will be described with reference to FIG. 1.

FIG. 1 illustrates a femtocell included in a communication network in accordance with at least one embodiment.

Referring to FIG. 1, communication network 100 may include heterogeneous cells such as macrocell 120 and a plurality of femtocells 140 and 160. Communication network 100 may further include core network 190 coupled to macrocell 120 and a plurality of femtocells 140 and 160. Macrocell 120 may be formed and managed by macrocell base station 110. First femtocell 140 may be formed and managed by femtocell base station 130 and second femtocell 160 may be formed and managed by femtocell base station 150.

Typically, femtocell base stations 130 and 150 may be located inside or outside macrocell 120, which is a service area of macrocell base station 110. Accordingly, service areas of femtocell base stations 130 and 150 may be included in that of macrocell base station 110 or the service area of femtocell base stations 130 and 150 may be excluded from that of macrocell base station 110. Furthermore, service areas of femtocell base stations 130 and 150 may overlap with that of macrocell base station 110. Femtocell base stations 130 and 150 may be installed for improving a quality of service (QoS) at a certain area or for maintaining a certain level of a QoS at a certain area. For example, femtocell base stations 130 and 150 may be installed at indoor shadow areas or outdoor shadow areas. Femtocell base stations 130 and 150 may be installed at an area having excessive data traffic (i.e., congestion area) and/or at a cell having excessive load.

As shown in FIG. 1, femtocell base stations 130 and 150 and macrocell base station 110 are coupled to core network 190. Core network 190 may be a central part of a telecommunication network that provides various services including call routing to users who are connected by an access network. Core network 190 may include a plurality of nodes for aggregation, authentication, call control/switching, charging, service invocation, and gateways.

In accordance with at least one embodiment, femtocell base stations 130 and 150 may perform adaptive call admission control according to a type of a call, such as a normal call and a preferred call. Particularly, femtocell base stations 130 and 150 may determine a call admission capacity for normal calls and a reserved call admission capacity only for the preferred calls and adaptively control call admission based on the determined call admission capacities. The call admission capacity for the normal call may be referred to as an available call admission capacity and the call admission capacity for the preferred call may be referred to as a reserved call admission capacity. In case of the preferred call, femtocell base stations 130 and 150 may allow user equipment 170 to be accessed within a range of the reserved call admission capacity although the available call admission capacity reaches a limit.

For example, femtocell base stations 130 and 150 may receive a call access request from user equipment 170 and determine whether such request is for a normal call or a preferred call. The normal call may be a call without a priority assigned. The preferred call may be a call assigned with a predetermined priority. For example, the preferred call may be a call having a high Quality of Service (QoS) priority, such as a voice over internet protocol (VoIP) call. The preferred call may be a call handed off from neighbor cells. Furthermore, the preferred call may be an emergency call, such as a call to a specific place including a police station or a fire department. The preferred call may include a VoIP call, a hand-in call, and an emergency call, but the present invention is not limited thereto. Accordingly the type of the requested call, femtocell base stations 130 and 150 may perform adaptive call admission control differently in accordance with at least one embodiment.

When the call access request is for the normal call, femtocell base stations 130 and 150 may allow requesting user equipment 170 to be accessed until the available call admission capacity reaches a predetermined normal call limit in accordance with at least one embodiment. Such predetermined normal call limit may be set when femtocell base stations 130 and 150 are initiated and updated regularly during operation. Such setting and updating will be described in detail with reference to FIG. 2. After the available call admission capacity exceeds the predetermined limit, femtocell base stations 130 and 150 may deny requesting user equipment 170 to be accessed in accordance with at least one embodiment.

When the call access request is for the preferred call, femtocell base stations 130 and 150 may allow requesting user equipment 170 to be accessed until the reserved call admission capacity reaches a predetermined preferred call limit although the available call admission capacity exceeds the predetermined normal call limit in accordance with at least one embodiment. Such predetermined preferred call limit may be set when femtocell base stations 130 and 150 are initiated and updated regularly during operation. Such setting and updating will be described in detail with reference to FIG. 2. After the reserved call admission capacity exceeds the predetermined preferred call limit, femtocell base stations 130 and 150 may deny requesting user equipment 170 to be accessed in accordance with at least one embodiment.

As described, femtocell base stations 130 and 150 may restrict the number of user equipments (e.g., user equipment 170) to be accessed according to the type of call in accordance with at least one embodiment. The number of user equipments to be accessed for a normal call may be determined as the available call admission capacity. Furthermore, the number of user equipments 170 to be accessed for a preferred call may be determined as the reserved call admission capacity. That is, an overall call admission capacity of femtocell base stations 130 and 150 may be divided into an available call admission capacity and a reserved call admission capacity. The overall call admission capacity may be the maximum number of user equipments that femtocell base stations 130 and 150 can simultaneously manage or provide a related service to using limited resources. The available call admission capacity may be the number of users (i.e., user equipments) that femtocell base stations 130 and 150 can allow access and simultaneously provide a related service for normal calls. Such normal calls may include the preferred calls. That is, a femtocell base station may allow access of user equipments for any calls including a normal call and a preferred call until the available call admission capacity reaches the predetermined normal call admission limit. The reserved call admission capacity may be the number of users (i.e., user equipments) that femtocell base stations 130 and 150 can allow access and simultaneously provide a related service for preferred calls. The overall call admission capacity, the available call admission capacity, and the reserved call admission capacity may be defined using related parameters in accordance with at least one embodiment.

For example, parameters related to adaptive call admission control (i.e., call admission control parameters) may be defined in Table 1 below. Femtocell base stations 130 and 150 may set the call admission control parameters when femtocell base stations 130 and 150 are initiated and update the call admission control parameters during operation.

TABLE 1

| Name | Definition |
| --- | --- |
| Max_Active_User | The overall call admission capacity: it might be the maximum number of users (i.e., user equipments) that a femtocell base station can allow access and provide a related service at the same time. |
| Available_Active_User | The available call admission capacity: it might be the number of users (i.e., user equipments) that a femtocell base station can allow access and provide a related service for normal calls (or any calls) at the same time. |
| Reserve_User | The reserved call admission capacity: it might be the number of users (i.e., user equipments) that a femtocell base station can allow access and provide a related service only for the preferred call at the same time. It might be the number of users reserved for allowing a preferred call. |

The parameter Max_Active_User may denote the overall call admission capacity of respective femtocell base stations 130 and 150. That is, the parameter Max_Active_User may be determined based on the maximum number of users (i.e., user equipment) that respective femtocell base stations 130 and 150 can allow access and provide a service for calls, including a normal call and a preferred call, at the same time. The parameter of Available_Active_User may denote the available call admission capacity of respective femtocell base stations 130 and 150. That is, the parameter Available_Active_User may be determined based on the number of users (i.e., user equipments) that respective femtocell base stations 130 and 150 can allow access and provide a service for the normal call at the same time. The parameter of Reserve_User may denote the reserved call admission capacity of respective femtocell base stations 130 and 150. The parameter of Reserve_User may be determined based on the number of reserved users (i.e., user equipments) that respective femtocell base stations 130 and 150 can allow access and provide a service for the preferred call at the same time. Accordingly, the parameter of Max_Active_User may be equal to the sum of the parameters of Available_Active_User and Reserve_User.

As described, the call admission control parameters may be set upon the initiation of femtocell base stations 130 and 150. After the initial setup of the call admission control parameters, femtocell base stations 130 and 150 may regularly update call admission control parameters in accordance with at least one embodiment. For example, femtocell base stations 130 and 150 may update the parameters of Reserve_User and Available_Active_User within a range of the parameter of Max_Active_User. When updating the call admission control parameters, femtocell base stations 130 and 150 may refer to statistical values calculated based on information accumulated for a predetermined time period. Such information may be obtained from call access requests or results of monitoring status of a femtocell base station during a predetermined time period. The information may include the number of user equipments simultaneously in service at a femtocell base station in a certain time period, the number of calls handed in from neighbor base stations in a certain time period, the number of VoIP calls in a certain time period, the number of calls invoked at each time period, and the number of normal calls and the number of preferred calls requested in a predetermined time period, and but the present invention is not limited thereto.

For example, as accumulating information on call access requests for a first time period and a second time period or as a result of monitoring status of femtocell base stations 130 and 150 for a first time period and a second time period, the average number of hand-in calls in the first period is 3 and the average number of hand-in calls in the second time period is 5 in femtocell base stations 130 and 150. In this case, femtocell base stations 130 and 150 may set a value of the parameter Reserve_User in the first time period as 3 and set a value of the parameter Reserve_User in the second time period as 5. That is, femtocell base stations 130 and 150 may set the reserved call admission capacity for the first time period as 3 and the reserved call admission capacity for the first time period as 5.

For another example, as accumulating information on call access requests for a first time period and a second time period or as a result of monitoring status of femtocell base stations 130 and 150 for a first time period and a second time period, the average number of hand-in calls and VoIP calls in a first time period may be 4 and the average number of hand-in calls and VoIP calls in a second time period may be 5 in femtocell base stations 130 and 150. In this case, femtocell base stations 130 and 150 may set a value of Reserve_User in the first time period as 4 and set a value of Reserve_User in the second time period as 5. That is, femtocell base stations 130 and 150 may set the reserved call admission capacity for the first time period as 4 and the reserved call admission capacity for the second time period as 5.

The values of all the call admission control parameters were described as being set based on the accumulated information (i.e., information on call access requests or monitoring results), but the present invention is not limited thereto. For example, femtocell base stations 130 and 150 may determine one of the call admission parameters Available_Active_User and Reserve_User based on the accumulated information and calculate the other based on the determined parameters. Particularly, femtocell base stations 130 and 150 may obtain a value of the parameter Available_Active_User, which may be the number of normal calls to accept, by subtracting the value of the parameter Reserve_User from a value of Max_Active_User. Furthermore, femtocell base stations 130 and 150 may obtain a value of the parameter Reserve_User, which is the number of preferred calls to accept, by subtracting the value of the parameter Available_Active_User from a value of Max_Active_User. Accordingly, femtocell base stations 130 and 150 may calculate one of the statistic values of the parameters Available_Active_User and Reserve_User based on the accumulated information and updates the call admission control parameters based on the calculated statistic value.

As described above, an overall call admission capacity may be divided into the available call admission capacity and the reserved call admission capacity, and the available call admission capacity and the reserved call admission capacity may be set and updated based on a result of monitoring status of a respective femtocell base station for a certain time period in accordance with at least one embodiment. Based on such available call admission capacity and reserved call admission capacity, femtocell base stations 130 and 150 may perform adaptive call admission control in accordance with at least one embodiment of the present disclosure. For example, femtocell base stations 130 and 150 may allow access of user equipments requesting for both of normal calls and preferred calls until the number of user equipments requesting for normal calls and preferred calls reaches to the value of the parameter Available_Active_User. After the number of user equipments requesting for normal calls equals to the value of the parameter Available_Active_User, femtocell base stations 130 and 150 may allow access of user equipments requesting for the preferred calls until the number of user equipments requesting for the preferred calls reaches the value of the parameter Reserve_User.

For another example, femtocell base stations 130 and 150 may allow access of user equipments requesting normal calls within a range of the parameter Available_Active_User. Furthermore, femtocell base stations 130 and 150 may allow access of user equipments requesting preferred calls within a range of the parameter Reserve_User. When the number of user equipments simultaneously served by a corresponding femtocell base station for normal calls reaches the value of the parameter Available_Active_User, femtocell base stations 130 and 150 deny requests by new user equipment for the normal call. When the number of user equipments simultaneously served by a corresponding femtocell base station for preferred calls reaches the value of the parameter Reserve_User, femtocell base stations 130 and 150 deny requests by new user equipment for the preferred call. That is, femtocell base stations 130 and 150 deny access of new user equipment requesting for the preferred call.

In some embodiments, femtocell base stations 130 and 150 may additionally allow access of user equipments for a preferred call if the number of user equipments in service for the normal calls does not reach a value of the parameter Available_Active_User although the number of user equipments for the preferred call already reaches the value of the parameter Reserve_User. Such adaptive call admission control will be described in more detail with reference to FIG. 3 and FIG. 4.

As described, femtocell base stations 130 and 150 may adaptively control access of user equipments based on the call admission control parameters in accordance with at least one embodiment. Such call admission control parameters may be set upon the initiation of a femtocell base station and updated during operation. Such setup and update operation will be described with reference to FIG. 2, hereinafter. The setup and update operation will be described based on femtocell base station 130, but the present invention is not limited thereto. The same operation will be applied to any femtocell base stations including femtocell base station 150.

Figure 2:
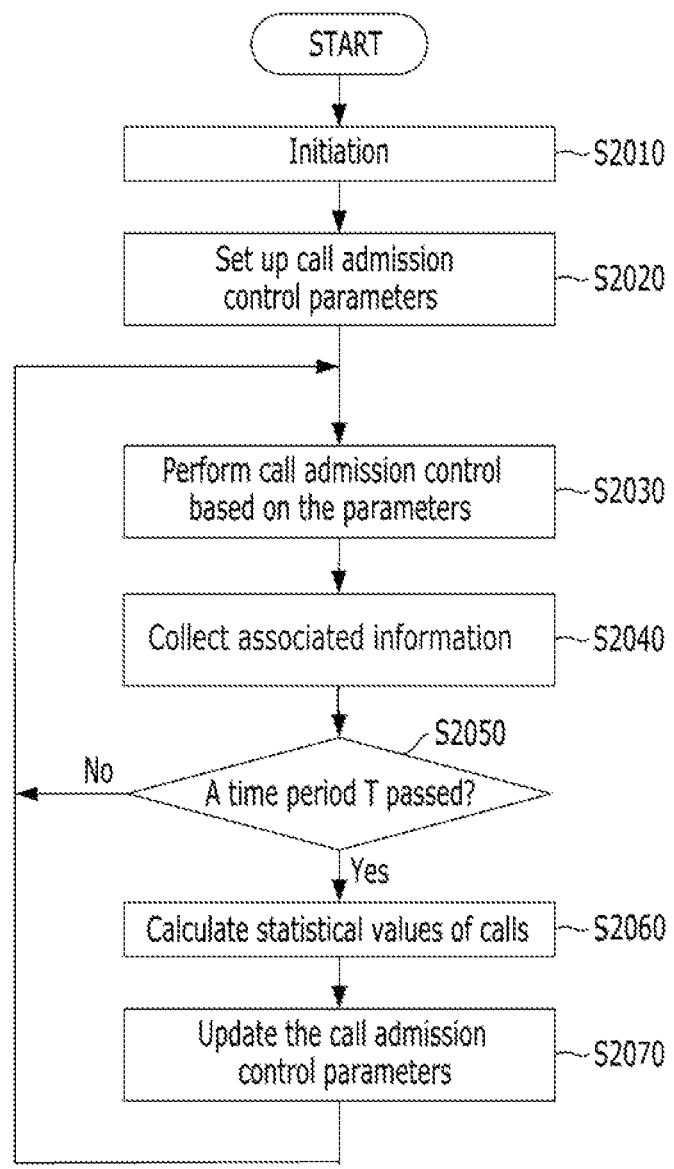
FIG. 2 shows a method for setting and updating call admission control parameters in accordance with at least one embodiment.

FIG. 2 shows a method for setting and updating call admission control parameters in accordance with at least one embodiment.

Referring to FIG. 2, femtocell base station 130 may be initiated when power is on at step S2010. For example, femtocell base station 130 may be installed a predetermined location such as an indoor shadow area or an outdoor shadow area. After the installation, femtocell base station 130 is powered on and initiated for providing a related service.

At step S2020, femtocell base station 130 may initially set call admission control parameters upon the initiation of femtocell base station 130. For example, femtocell base station 130 may set values of the call admission control parameters such as Max_Active_User, Reserve_User, and Available_Active_User. As described, call admission control parameters Max_Active_User, Reserve_User, and Available_Active_User may respectively denote an overall call admission capacity, an available call admission capacity and a reserved call admission capacity.

In order to set the call admission control parameters, femtocell base station 130 may receive information entered from a user through a predetermined input device provided with femtocell base station 130 or receive information transmitted from management servers (not shown) of core network 190. Particularly, femtocell base station 130 may receive values for all of the call admission control parameters Max_Active_User, Reserve_User, and Available_Active_User from a user or management servers in core network 190. Femtocell base station 130 may set all of the call admission control parameters based on the received values. Furthermore, femtocell base station 130 may receive values for at least one of the call admission control parameters Max_Active_User, Reserve_User, and Available_Active_User and calculate values of the others based on the received value. For example, femtocell base station 130 may receive values for the call admission control parameters Max_Active_User and Reserve_User and calculate a value for the call admission control parameter Available_Active_User based on the received values. In addition, femtocell base station 130 may receive values for the call admission control parameters Max_Active_User and Available_Active_User and calculate a value for the call admission control parameter Reserve_User based on the received values. That is, the overall admission capacity, the available call admission capacity, and the reserved call admission capacity may be set based on the information received from a user or from a management server in core network 190.

At step S2030, femtocell base station 130 may perform adaptive call admission control based on the initial setup of the call admission control parameters Max_Active_User, Reserve_User, and Available_Active_User and provide communication services to accessed user equipments. For example, femtocell base station 130 allows access of user equipment requesting a normal call and a preferred call until the number of user equipments in service for the normal call and the preferred call reaches a value of the parameter of Available_Active_User and denies access of user equipment requesting a normal call after the number of user equipments in service for the normal call and the preferred call reaches a value of the parameter of Available_Active_User. Furthermore, femtocell base station 130 still allows access of user equipment requesting a preferred call if the reserved call admission capacity does not reach the predetermined limit. Such adaptive call admission control will be described in detail with reference to FIG. 3.

While performing the adaptive call admission control, femtocell base station 130 may temporally store and accumulate information on call access requests whenever the call access requests are received at step S2040. Alternatively, while performing the adaptive call admission control, femtocell base station 130 may monitor status thereof and stores and accumulate information on the monitoring results for a certain time period in order to update the call admission control parameters at step S2040. For example, femtocell base station 130 monitors status thereof and store and accumulate information related to the parameters of Reserve_User and Available_Active_User. When updating the call admission control parameters, femtocell base stations 130 and 150 may refer to statistical values calculated based on information accumulated for a predetermined time period. Such information may be accumulated information on call access requests or results of monitoring status of a femtocell base station during a predetermined time period. For example, femtocell base station 130 may collect the information on the number of user equipments in service at a certain time period, the number of calls handed off from neighbor base stations in a certain time period, the number of VoIP calls in a certain time period, the number of calls invoked at each time period, and the number of normal calls and the number of preferred calls requested in a predetermined time period, and but the present invention is not limited thereto. Femtocell base station 130 may accumulate the collected information in a memory (e.g., memory 590 of FIG. 5).

At step S2050, femtocell base station 130 may determine whether a predetermined time period T is passed. For example, femtocell base station 130 regularly updates the call admission parameters at the predetermined time period T.

When the predetermined time period T does not pass (No—S2050), femtocell base statin 130 may continuously perform the adaptive call admission control at step S2030.

When the predetermined time period T passes (Yes—S2050), femtocell base station 130 may calculate statistical values related to the call admission control parameters based on the stored and accumulated information at step S2060. For example, femtocell base station 130 may obtain or calculate the average number of normal calls and the average number of preferred calls in the time period T based on the accumulated information stored in memory 590.

At step S2070, femtocell base station 130 may update the call admission control parameters based on the calculated statistical values. For example, femtocell base station 130 obtains 3 as the average number of hand-in calls in the first time period T1 and 5 as the average number of hand-in calls in the second time period T2. In this case, femtocell base station 130 sets the call admission control parameter of Reserve_User as 3 for the first time period T1. Furthermore, femtocell base station 130 sets the call admission control parameter of Reserve_User as 5 for the second time period T2. For example, femtocell base station 130 obtains 4 as the average number of hand-in calls and VoIP calls in the first time period T1 and 5 as the average number of hand-in calls and VoIP calls in the second time period T2. In this case, femtocell base station 130 sets the call admission control parameter of Reserve_User as 4 for the first time period T1 and as 5 for the second time period T2. In addition, femtocell base station 130 may set the call admission control parameter of Available_Active_User by subtracting the value of Reserve_User from the value of Max_Active_User.

After updating, femtocell base station 130 may continuously provide a communication service by performing adaptive call access control based on the updated parameters at step S2030. After a predetermined time passes (Yes—S2040), the value of the parameter Reserve_User users may be updated repeatedly based on the accumulated information.

As described, the call admission control parameters may be initially set upon the initiation of a femtocell base station and updated at a regular interval based on the accumulated information during operation in accordance with at least one embodiment. Femtocell base stations 130 and 150 may perform the adaptive call admission control based on the call admission control parameters (i.e., the available call admission capacity and the reserved call admission capacity) in accordance with at least one embodiment. Such operation will be described in more detail with reference to FIG. 3.

Figure 3:
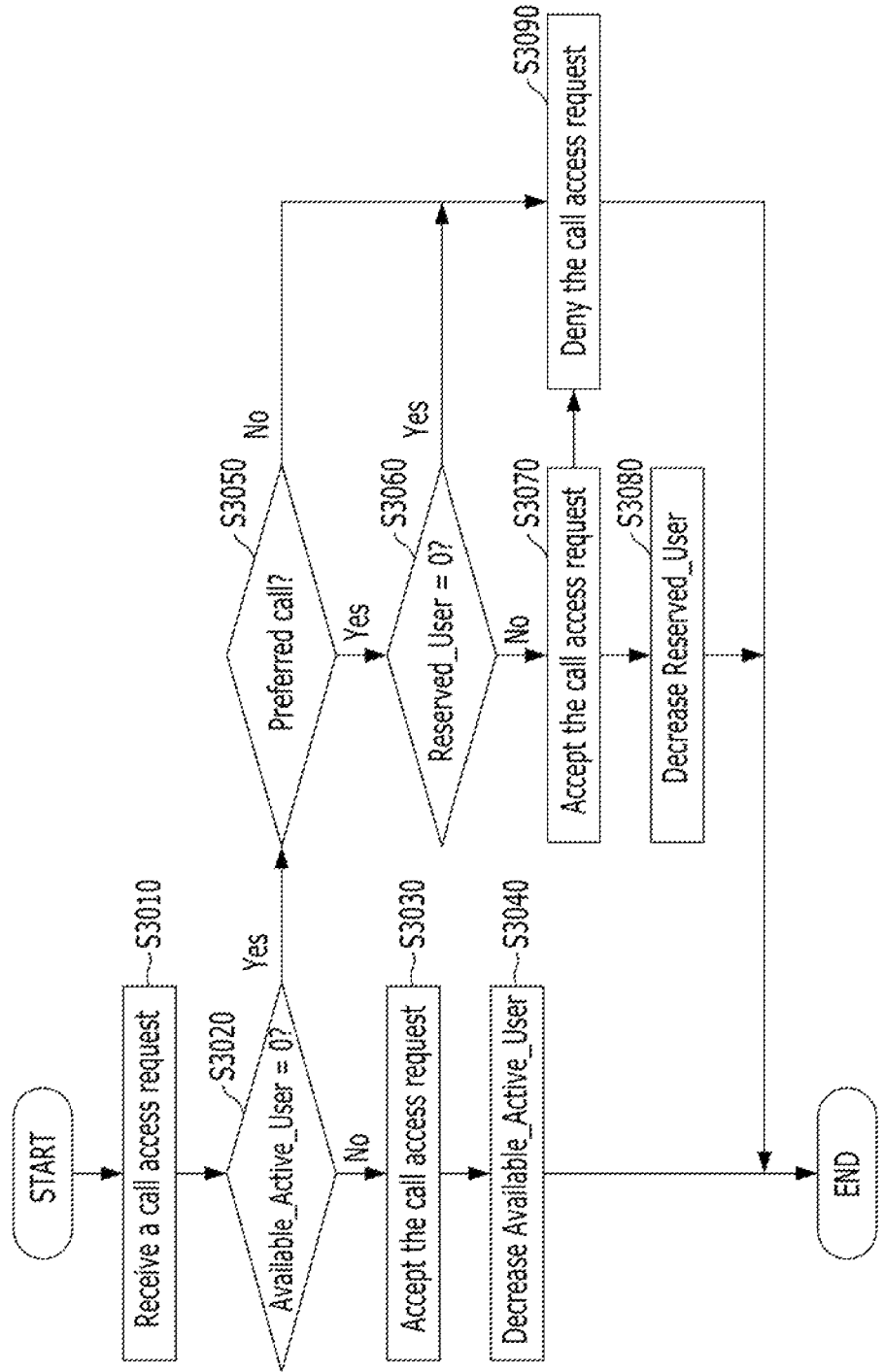
FIG. 3 shows a method for adaptive call admission control in accordance with at least one embodiment.

FIG. 3 shows a method for adaptive call admission control in accordance with at least one embodiment.

Referring to FIG. 3, a call access request may be received at step S3010. For example, femtocell base station 130 may receive a call access request from user equipment 170. Such a call access request may be for a normal call or a preferred call. As described, the preferred call may be a call assigned with a predetermined priority. The normal call may be any call without a predetermined priority assigned. Such a preferred call may be a hand-in call, which is handed in from neighbor base stations, a VoIP call, and an emergency call, but the present invention is not limited thereto. As described, femtocell base station 130 may adaptively perform call admission control according to a type of a call in accordance with at least one embodiment.

At step S3020, determination may be made as to whether a call admission control parameter Available_Active_User is equal to 0. For example, femtocell base station 130 may determine whether an available call admission capacity reaches a predetermined limit based on the call admission control parameter of Available_Active_User. That is, femtocell base station 130 may determine whether there are remaining resources to accept calls from user equipments based on the call admission control parameter of Available_Active_User. In order to determine, femtocell base station 130 may compare a value of Available_Active_User with '0'. When the value of Available_Active_User is equal to '0', femtocell base station 130 determines that the available call admission capacity reaches the limit or that there is no available resource to accept calls. Otherwise, femtocell base station 130 determines that the available call admission capacity dose not reaches the limit or that there are some available resources to accept calls (i.e., to allow access of femtocell base statin 130 requesting the call).

When the parameter Available_Active_User is not equal to 0 (No—S3020), user equipment requesting the call may be allowed access at step S3030. For example, femtocell base station 130 may allow access to user equipment 170 requesting the call when the available call admission capacity does not reach the predetermined limit.

After allowing, a value of the parameter Available_Active_User may decrease by a predetermined value at step S3040. For example, femtocell base station 130 decreases the value of the parameter Available_Active_User by one.

When the value of the parameter Available_Active_User is equal to 0 (Yes—S3020), determination may be made as to whether the call access request is for a preferred call at step S3050. For example, when the available call admission capacity reaches the predetermined limit, femtocell base station 130 determines whether the call access request is for a preferred call.

When the call access request is not for the preferred call (No—S3050), the call access request may be denied at step S3090. For example, femtocell base station 130 denies the call access request from user equipment 170 because the available call admission capacity reaches the predetermined limit and the call access request is not for the preferred call. Such operation may include controlling user equipment 170 to access the other cells (i.e., neighbor base stations) or releasing a connection to user equipment 170.

When the call access request is for the preferred call (Yes—S3050), determination may be made as to whether the call admission control parameter Reserve_User is equal to 0 at step S3060. For example, femtocell base station 130 may determine whether the reserved call admission capacity reaches a predetermined limit. When the value of the parameter Reserve_User is not equal to 0, femtocell base station 130 may determine there are remaining resources for allowing access of user equipment for the preferred call. When the value of the parameter Reserve_User is equal to 0, femtocell base station 130 may determine there are no reserved resources left for allowing access of user equipment for the preferred call.

When the parameter Reserve_User is not equal to 0 (No—S3060), the call access request may be accepted at step S3070. For example, when the reserved call admission capacity does not reach the predetermined limit, femtocell base station 130 allows user equipment 170 requesting the preferred call to be accessed for the preferred call.

After allowing, the value of the parameter Reserve_User may decrease by a predetermined number at step S3080. For example, femtocell base station decreases the value of Reserve_User decreases by 1.

When the parameter Reserve_User is equal to 0 (Yes—S3060), the call access request may be denied at step S3090. For example, when the reserved call admission capacity reaches the predetermined limit, femtocell base station 130 does not allow access of user equipment 170 requesting the preferred call.

As described, femtocell base station 130 may allow access of user equipments 170 if user equipment 170 requests the preferred call although the available call admission capacity reaches the predetermined limit. That is, some resources may be reserved for the preferred calls in order to allow access of user equipment requesting the preferred calls although the call admission capacity reaches a certain limit. In this way, predetermined types of calls may have a privilege to be processed in accordance with at least one embodiment of the present disclosure. Accordingly, the overall QoS may be maximized using limited resources in accordance with at least one embodiment.

Figure 4:
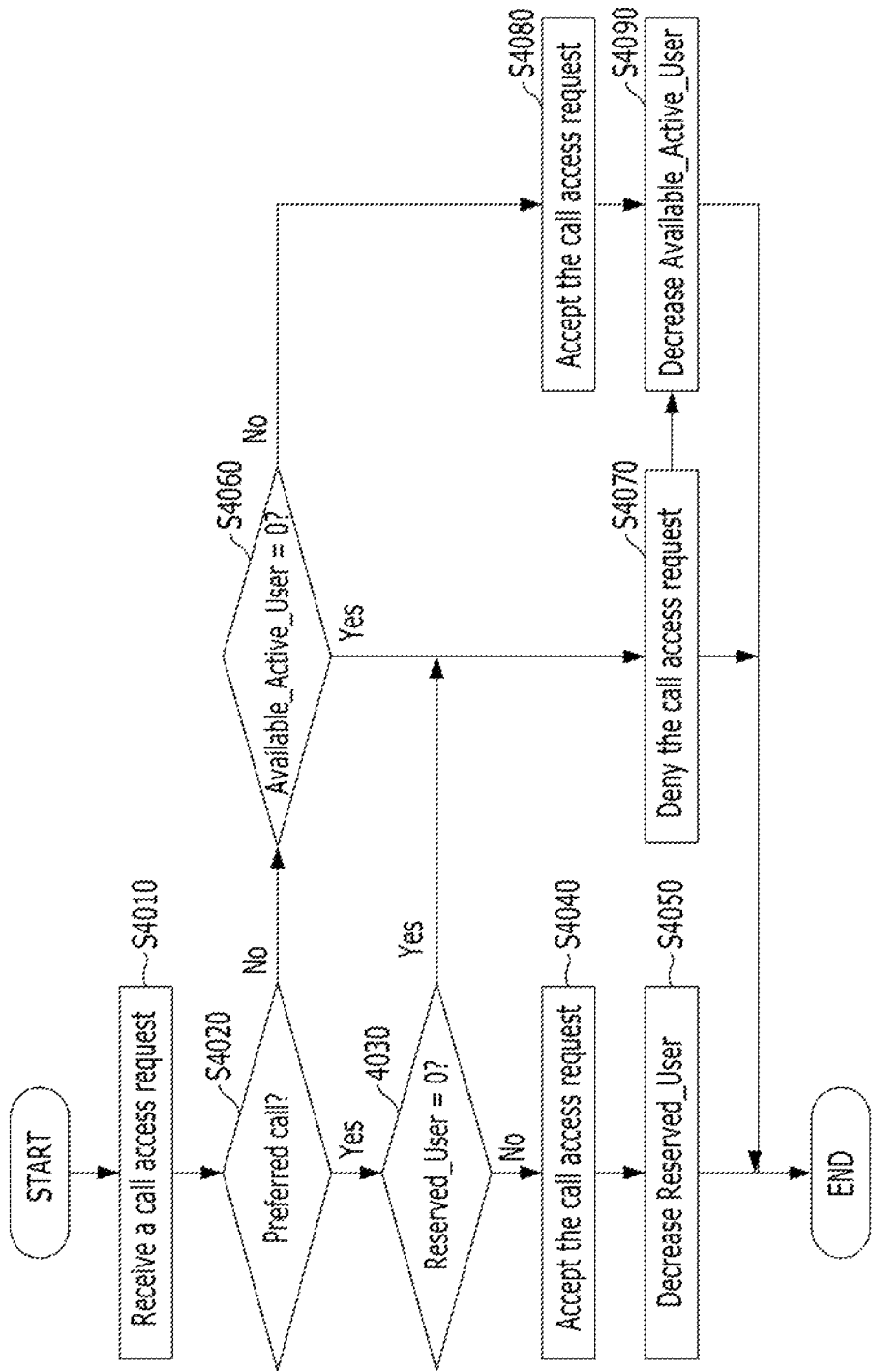
FIG. 4 shows a method for call admission control in accordance with at least one embodiment.

FIG. 4 shows a method for call admission control in accordance with at least one embodiment.

Referring to FIG. 4, a call access request may be received at step S4010. For example, femtocell base station 130 may receive a call access request from user equipment 170. Such a call access request may be for a normal call or a preferred call. The preferred call may be a call assigned with a predetermined priority. Such preferred call may be a hand-in call, which is handed in from neighbor base stations, a VoIP call, and an emergency call, but the present invention is not limited thereto.

At step S4020, determination may be made as to whether the call access request is for a preferred call or not at step S4020. For example, femtocell base station 130 determines whether the call access request is for a call assigned with a predetermined priority, such as a VoIP call, a hand-in call, and an emergency call. Femtocell base station 130 determines that the call access request is for the preferred call when the call access request is for the call assigned with the predetermined priority. Otherwise, femtocell base station 130 determines that the call access request is not for the preferred call.

When the call access request is the preferred call (Yes—S4030), determination may be made as to whether the call admission control parameter Reserve_User is equal to 0 at step S4030. For example, femtocell base station 130 determines whether the reserved call admission capacity reaches a predetermined limit. When the value of the parameter Reserve_User is not equal to 0, femtocell base station 130 may determine there are remaining resources for allowing access of user equipment for the preferred call. When the value of the parameter Reserve_User is equal to 0, femtocell base station 130 may determine there are no reserved resources left for allowing access of user equipment for the preferred call.

When the parameter Reserve_User is not equal to 0 (No—S4030), the call access request may be accepted at step S4040. For example, when the reserved call admission capacity does not reach the predetermined limit, femtocell base station 130 allows user equipment 170 requesting the preferred call to be accessed.

After allowing, the value of the parameter Reserve_User may decrease by a predetermined number at step S4050. For example, femtocell base station decreases the value of Reserve_User decreases by 1.

When the parameter Reserve_User is equal to 0 (Yes—S4030), the call access request may be denied at step S4070. For example, when the reserved call admission capacity reaches the predetermined limit, femtocell base station 130 does not allow access of user equipment 170 requesting the preferred call.

When the call access request is not the preferred call (No—S4020), determination may be made as to whether a call admission control parameter Available_Active_User is equal to 0 at step S4060. For example, femtocell base station 130 may determine whether an available call admission capacity reaches a predetermined limit based on the call admission control parameter of Available_Active_User when the call access request is not for the preferred call.

When the parameter Available_Active_User is not equal to 0 (No—S4060), user equipment requesting the call may be allowed to be accessed at step S4080. For example, femtocell base station 130 allows access of user equipment 170 to be accessed when the available call admission capacity does not reach the predetermined limit.

After allowing, a value of the parameter Available_Active_User may decrease by a predetermined value at step S4090. For example, femtocell base station 130 decreases the value of the parameter Available_Active_User by one.

When the parameter Available_Active_User is equal to 0 (Yes—S4060), the call access request may be denied at step S4070. For example, when the available call admission capacity reaches the predetermined limit, femtocell base station 130 does not allow access of user equipment 170.

As described, femtocell base stations 130 and 150 may accept a call request if the requested call has a certain priority assigned although call admission capacity thereof reaches or exceeds a certain limit in accordance with at least one embodiment. Hereinafter, a femtocell base station for adaptive call admission control will be described with reference to FIG. 5. Femtocell base station 130 will be described representatively, but the present invention is not limited thereto. Although femtocell base station 150 is not described, femtocell base station 150 may have a similar or the same configuration to that of femtocell base station 130.

Figure 5:
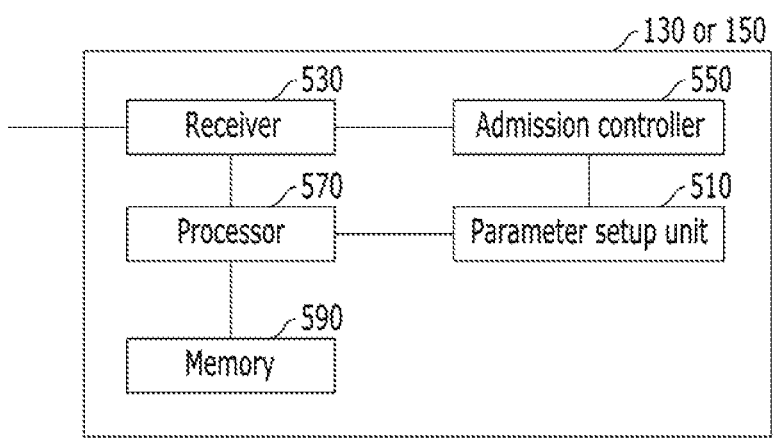
FIG. 5 shows a femtocell base station in accordance with at least one embodiment.

FIG. 5 shows a femtocell base station in accordance with at least one embodiment.

Referring to FIG. 5, femtocell base station 130 may include parameter setup unit 510, receiver 530, admission controller 550, processor 570, and memory 590.

Parameter setup unit 510 may set parameters related to adaptive call admission control, which may be referred to as call admission control parameters. For example, call admission control parameters may include Max_Active_User, Reserve_User, and Available_Active_User. As described, the parameter Max_Active_User may denote an overall call admission capacity, the parameter Reserve_User may denote a reserved call admission capacity for a preferred call, and the parameter Available_Active_User may denote an available call admission capacity. The available call admission capacity may be equal to subtraction of the reserved call admission capacity from the overall call admission capacity.

Parameter setup unit 510 may set the call admission parameters when femtocell base station 130 is initiated, for example, when femtocell base station 130 is turned on. The present invention, however, is not limited thereto. For example, parameter setup unit 510 may regularly set the call admission parameters at a certain interval. Furthermore, parameter setup unit 510 may refer inputs from users for setting up the call admission parameters or respond to the control of a management server for setting up the call admission parameters.

Such initial setup call admission parameters may be updated at a certain interval. For example, parameter setup unit 510 may update the initial setup call admission parameters including Reserve_User and Available_Active_User. Particularly, parameter setup unit 510 may update Reserve_User and Available_Active_User based on statistical values calculated based on results of monitoring status of a respective femtocell base station. Such calculation may be performed by processor 570.

For example, processor 570 calculates that the average number of hand-in calls in a first time period is three and the average number of hand-in calls in a second time period is five. In this case, parameter setup unit 510 may set up the parameter Reserve_User in the first time period as three and the parameter Reserve_User in the second time period as five. Furthermore, parameter setup unit 510 may set up the parameter Available_Active_User in the first time period as seven and the Available_Active_User in the second time period as five.

Receiver 530 may receive a call access request from user equipment 170. In response to the control of controller 550, such a call access request may be accepted or denied. In addition, receiver 530 may deliver information on the call access request to processor 570 whenever receiver 530 receives the call access request.

Processor 570 may receive information on the call access request from receiver 530 and temporally store and accumulate the received information in memory 590. Alternatively, processor 570 may be provided with results of monitoring statuses thereof and temporally store and accumulate the monitoring results in memory 590. Processor 570 may calculate the average number of normal calls (i.e., calls not assigned with a predetermined priority) and the average number of preferred calls (i.e., calls assigned with a predetermined priority) in each time period based on the accumulated information. After calculation, processor 570 may deliver the calculated statistical values to parameter setup unit 510.

Controller 550 may perform adaptive call access control on the received call request based on the call admission control parameters from parameter setup unit 510.

In accordance with at least one embodiment, controller 550 may accept calls within a range of the available call admission capacity (i.e., the parameter Available_Active_User) at first. When the available call admission capacity (i.e., the parameter Available_Active_User) reaches a certain number, controller 550 may additionally accept only the preferred calls within a range of the reserved call admission capacity (i.e., the parameter Reserve_User).

In some embodiments, controller 550 may accept normal calls (i.e., calls not assigned with a predetermined priority) within a range of the available call admission capacity (i.e., Available_Active_User) and accepts preferred calls within a range of the reserved call admission capacity (i.e., Reserve_User). Accordingly, when the number of user equipments in service for normal calls is equal to a value of the parameter Available_Active_User, controller 550 may not accept new calls. When the number of user equipments in service for preferred calls is equal to a value of the parameter Reserve_User, controller 550 may not accept new preferred calls.

When the number of user equipments in service for the preferred calls is equal to the value of the parameter Reserve_User and when the number of user equipments in service for the normal calls is smaller than the value of the parameter Available_Active_User, controller 550 may additionally accept preferred calls the value of the parameter Available_Active_User becomes 0.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of adaptive call admission control in a femtocell base station, the method comprising:
   receiving a call access request from a user equipment;
   determining whether a call type is one of a normal call and a preferred call based on the received call access request corresponding to the call after an available call admission capacity of the femtocell base station reaches a first limit; and
   when the determined call type is the preferred call, performing adaptive call admission control according to the determined call type by accepting the received call access request for the preferred call if the reserved call admission capacity has not reached a second limit.

2. The method of claim 1, wherein the determining whether a call type includes:
   determining the call type as the preferred call when an associated call is assigned with a priority; otherwise,
   otherwise, determining the call type as the normal call.

3. The method of claim 2, wherein for the determining the call type as the preferred call, a preferred call includes at least one of a voice over internet protocol (VoIP) call, a hand-in call from a neighbor base station, and an emergency call.

4. The method of claim 1, the performing adaptive call admission control includes:
   determining whether the available call admission capacity of the femtocell base station reaches the second limit.

5. The method of claim 4, wherein the accepting the received call access request for the preferred call includes:
   declaring that the reserved call admission capacity reaches the first limit when a value of a parameter Reserve_User reaches a corresponding threshold.

6. The method of claim 1, wherein when the call type is the normal call, the performing adaptive call admission control includes:
   accepting the received call access request for the normal call when the available call admission capacity has not reached the first limit.

7. The method of claim 6, wherein the accepting the received call access request for the normal call includes:
   declaring that the available call admission capacity reaches the first limit when the value of the parameter Available_Active_User reaches a predetermined threshold.

* * * * *